Nov. 3, 1936.                H. KLATT                 2,059,528
                        REVOLVING WING AIRCRAFT
                         Filed Oct. 10, 1934         3 Sheets-Sheet 1
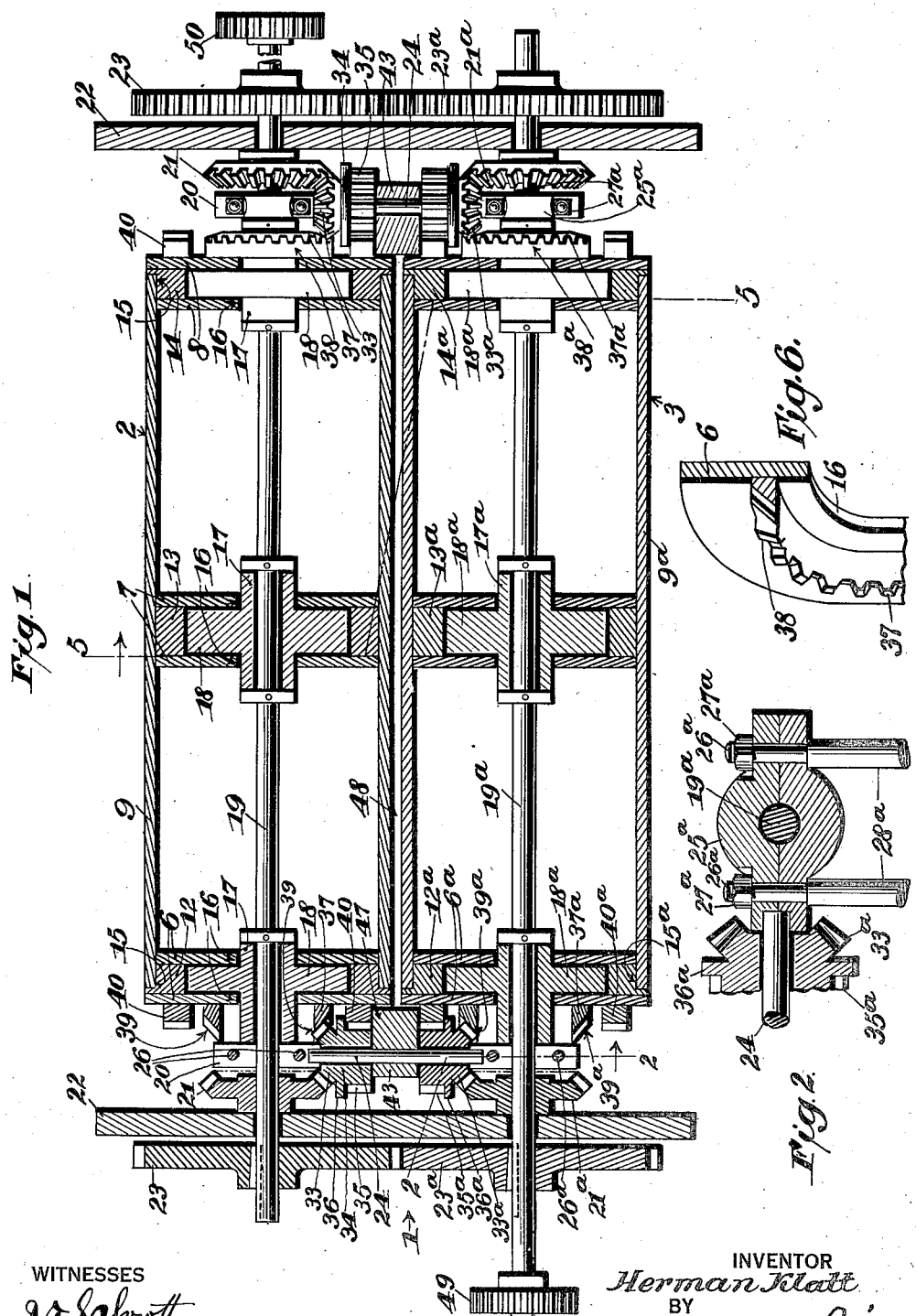
WITNESSES
INVENTOR
Herman Klatt
BY
Munn, Anderson & Liddy
ATTORNEY

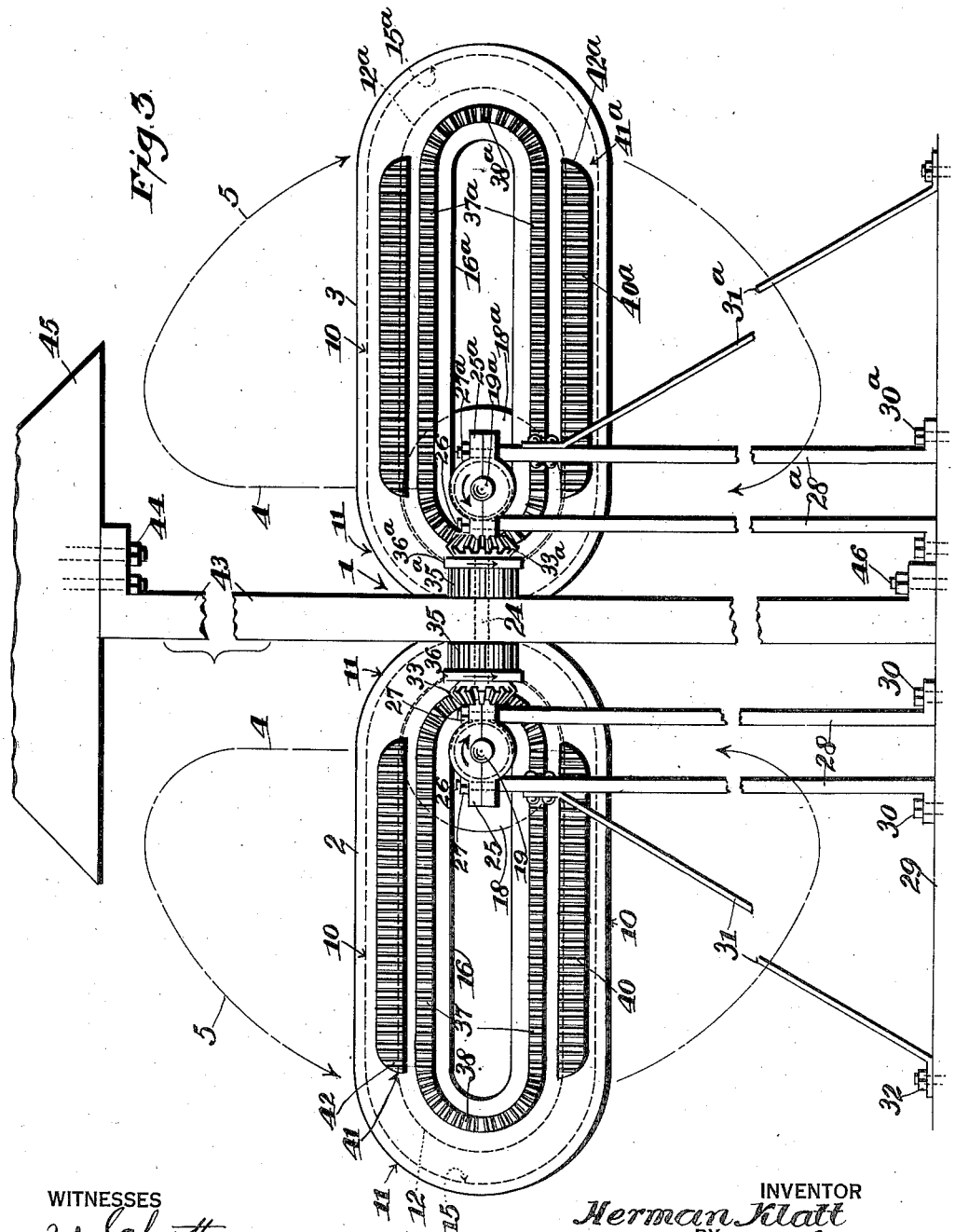

Nov. 3, 1936.     H. KLATT     2,059,528
REVOLVING WING AIRCRAFT
Filed Oct. 10, 1934     3 Sheets-Sheet 3
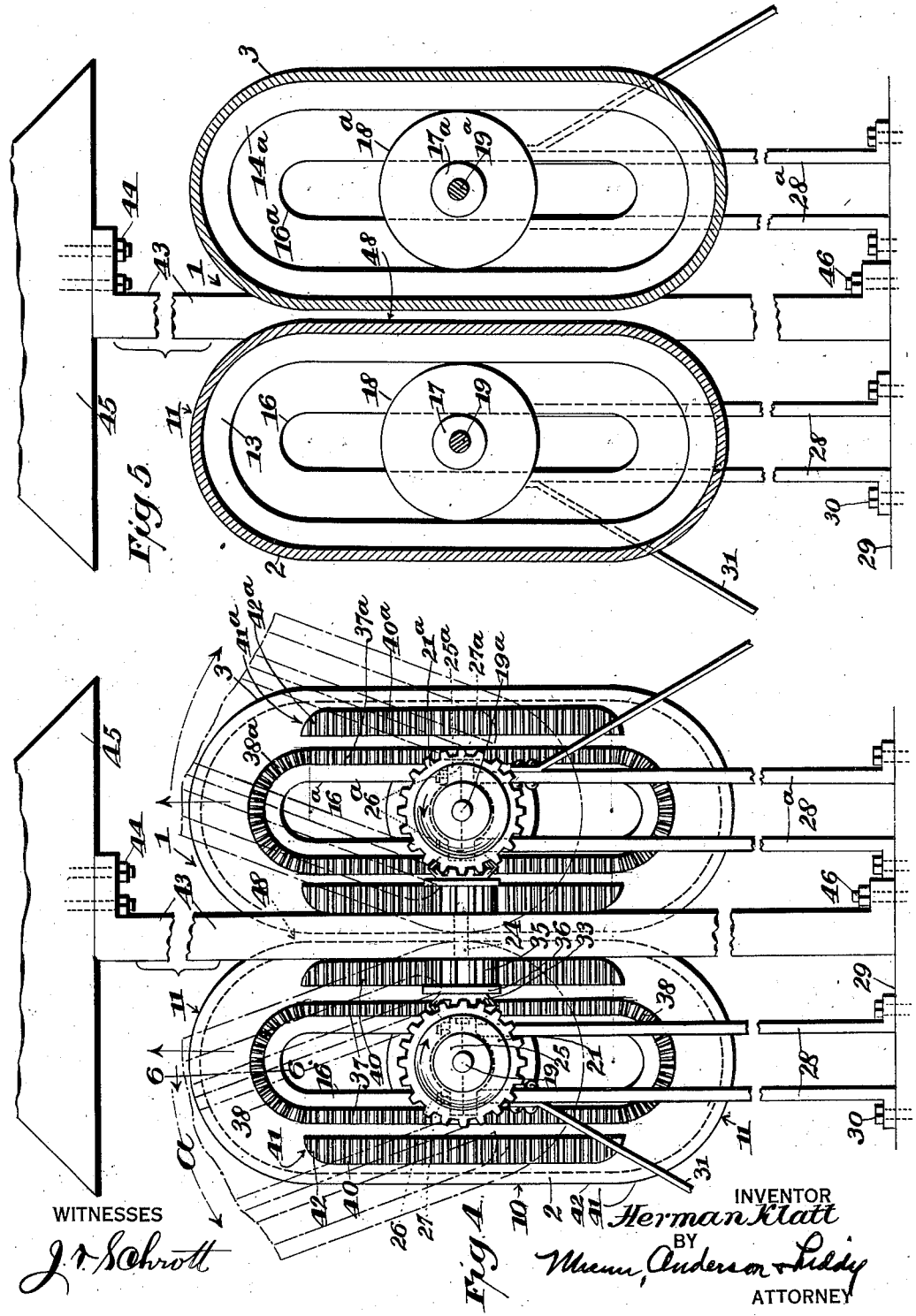
WITNESSES
INVENTOR
Herman Klatt
BY
Munn, Anderson & Liddy
ATTORNEY Patented Nov. 3, 1936

2,059,528

UNITED STATES PATENT OFFICE 2,059,528

REVOLVING WING AIRCRAFT

Herman Klatt, Pueblo, Colo.

Application October 10, 1934, Serial No. 747,771

14 Claims. (Cl. 244—11)

This invention relates to improvements in aircraft of the helicopter type, and its objects are as follows:—

First, to provide a wing having wing members which successively move together along rectilinear paths and then turn outwardly and away from each other in arcuate paths to complete a cycle of operation, the improvement herein brought out being especially intended to prevent slamming of the wing members when they come close to each other preparatory to repeating the rectilinear movements.

Second, to provide means for preventing the wing members from actually coming together and slamming at the ends of their opposite circular movements, so that the cycle of operation can be gone through repeatedly with a minimum amount of noise and with no danger of the wing members becoming destroyed by violent contact with each other.

Third, to hold the wing members to true and parallel paths when partaking of the foregoing rectilinear motion.

Fourth, to provide means in the operating mechanism of each wing member tending to absorb the shock of the rather sudden changes in direction especially at the end of the arcuate movements and when returning to the rectilinear movements.

Other objects and advantages will appear in the following specification, reference being had to the accompanying drawings in which Figure 1 is a horizontal section of a complete wing or wing set, the two wing members being close together as when traversing their rectilinear paths.

Figure 2 is a detail cross section taken on the line 2—2 of Figure 1, especially illustrating one of the main bearings.

Figure 3 is a front elevation of the wing, as well as related structure, the wing members being illustrated as traversing their arcuate paths, portions of the structure shown in Figure 1 being omitted.

Figure 4 is a view similar to Figure 3, but showing the wing members as traversing their rectilinear paths.

Figure 5 is a cross section taken substantially on the line 5—5 of Figure 1.

Figure 6 is a detail cross section on the line 6—6 of Figure 4, particularly showing one of the semi-circular end bevel gear sections.

In the drawings, a wing set or complete wing is generally designated 1. This set comprises a pair of hollow, cross sectionally elongated wing members 2, 3. These members are adapted to move along rectilinear parallel paths 4 (Fig. 3) while close together (Fig. 4), and upon oppositely outward arcuate paths 5 (Fig. 3) at the end of the upward rectilinear motion. These motions are made to occur in succession, and the result is a beating action on the air similar to the wings of a bird. The underlying principle of the invention is to keep the wing members from slamming together at the end of the arcuate motions 5.

It is desired to explain that one or more of these anti-slamming wings can be used on a helicopter, for lifting, pushing or pulling according to the manner brought out in the patent to Herman Klatt, No. 1,911,695 of May 30, 1933. Both of the wing members 2, 3 are of identical construction. The immediately following description is, therefore, devoted to the wing member 2. All corresponding parts in the wing member 3 are designated by identical reference characters with the exponent letter $a$ for the purpose of distinction, this without specifically describing the member 3.

A framework consisting of matching pairs of plates 6, 7 and 8 (Fig. 1) includes a suitable cover 9 which completes the hollow member 2. Said member is so termed largely for convenience, because it is not strictly hollow inasmuch as it contains certain plates as well as other structure presently referred to.

These plates are of elongated form (Fig. 3). The opposite sides 10 are parallel but the ends 11 are made semicircular. The plates are supplemented by inserts 12, 13 and 14 (Fig. 1). These are continuous, central open pieces which in a sense constitute tracks. The various pairs of plates are secured to the respective inserts, and the cover 9, in turn, to the inserts, to make a strong but light wing member. The inserts serve as braces and are the source of much of the strength of the wing. It is preferred to rabbet the outermost inserts 12, 14 as at 15, and to set the cover 9 in the rabbets. This is especially advantageous since it provides rather wide recessed surfaces to which to secure the lateral margins of the cover 9.

Central slots 16 in all of the pairs of plates accommodate the hubs 17 of guide wheels 18 which are pocketed in the space between the various pairs of plates 6, 7 and 8, and are intended to contact the tracks 12, 13 and 14 especially during the time in which the wing member traverses the rectilinear path 4, thereby to assist in keeping it true to its path. The hubs 17 are loose on a drive shaft 19 which extends from end to end of the wing member and projects out at each end as plainly shown in Figure 1. There is enough space between the peripheries of the guide wheels 18 and the inserts or tracks 12, 13 and 14 to enable the guide wheels to roll along one side of each track without rubbing against the other side and so interfere with the motion.

Bearings 20 revolubly carry the drive shaft 19. Immediately to the outside of each bearing the shaft has a beveled gear 21 secured thereto. The shaft then extends through positioning members 22 which are intended to hold the drive shaft in place. They do this because the hubs of the beveled gears come into fairly close contact therewith and so prevent endwise movement of the drive shaft. The latter then carries spur gears 23 to which the driving power is applied.

A cross shaft 24 (Fig. 1) has end support in the bearings 20, 20ᵃ. The bearing 20 includes a cover 25 (Fig. 3) which when clamped down upon the nether part of the bearing fixedly secures the adjacent end of the cross shaft 24 (see Fig. 2) but at the same time does not interfere with the free rotation of the drive shaft 19. The clamping means for the cover 25 includes the stud ends 26 and nuts 27 of upright bars 28 (Fig. 3) which constitute the main supports of the bearings.

These bars are fastened down to the fuselage 29, the latter being merely suggested in the drawings, by bolts 30 or equivalent means. The bars 28 are braced at 31. The braces are also fastened down to the fuselage as indicated at 32.

The bevel gear 21 meshes with and drives the bevel pinion end 33 of a composite gear block 34, the other end of which consists of a spur pinion 35. These driver pinions are separated by a circular flange 36, the peripheral side of which stands out beyond the highest adjacent teeth, namely, those of the spur pinion 35. The block 34 consists of one piece so that the pinions 33, 35 virtually constitute one pinion. Each of the pinions has the same number of teeth. The purpose of the flange 36 is to aid in holding the wing members 2 in place when in motion, especially along the arcuate paths 5 (Fig. 3), when each flange engages the semi-circular end sections of the continuous gear tracks presently described.

On the outside of the outermost plates 6, 8 (Fig. 1) sets of racks (Fig. 4) are securely fastened. The rack arrangement of each plate is identical. Parallel inner racks 37 are connected by semi-circular bevel gear sections 38 which make a continuous, elongated track consisting of spur gear racks at the sides and bevel gear sections at the ends, said track confronting the respective bevel gear 21. The bevel pinion 33 drives the gear track, and by virtue of the fact that the pinion 33 is in constant mesh with the bevel gear 21 and the gear track 37, 38 the respective wing member is kept in perpetual control of the drive shaft 19, any possible running away of the wing member from the power applied, as might be caused for example by an inopportune gust of wind, being prevented. The teeth of the pinion mesh exactly with the bevel gear sections 38 during arcuate motion, and the points of the bevel pinion teeth mesh with the racks 37 during rectilinear motion chiefly for the purpose of balancing the bevel-spur pinion. In order that said points may mesh to best advantage the teeth of the racks 37 are given a slight outward pitch as designated at 39 (Fig. 1).

It will be understood that the pinion 33 is in constant mesh with the track 37, 38 thereby exerting a continuous driving effort on the respective wing member. However, this driving effort is only aided by the bevel gear pinion 33, nearly the whole driving power during rectilinear motion being exerted by the driver spur pinions 35 on straight rack sections 40 which are parallel to and flank the racks 37, and with which said spur pinions 35 are periodically meshed exactly. These rack sections in addition to their function in producing rectilinear motions of the wing members, comprise elements which insure said motion being absolutely true, and this because of their periodical engagement with guide means centered on the dividing plane between the wing members, as brought out below. The whole driving power during arcuate motion is accomplished by the driven bevel pinion in mesh with the end sections 38.

The racks 37, 40 are slightly spaced as shown. The flange 36 occupies part of the cross dimension of the space (Fig. 1), running closely to the adjacent rack section 40, the interengagement being responsible for assisting in holding the respective wing in place as was previously ascribed to the flange 36.

Rounded portions 41 at the outside ends of the rack sections 40 (Fig. 4) are intended to aid the easy connection and disconnection of the straight rack sections 40 with and from certain guide posts. The end rounding slightly diminishes the size of the last teeth 42 (Fig. 4). This diminution in the size of the end teeth somewhat aids the disconnection and reconnection of the rack sections 40 from and with the spur pinion 35. In addition to being subject to the greatest part of the driving effort the rack sections 40 also act as shock absorbers or antislamming means.

In ending this arcuate motion the tendency toward violence in the abrupt change will be largely diminished by the reengagement of the rack section 40 (then coming into position) with the pinion 35. The latter revolves at a uniform rate, and the foregoing reengagement tones down, so to speak, the flying action of the respective wing so that it too is operated with a high degree of uniformity.

All of the foregoing description as applied to the wing member 2 applies to its companion 3 as well, as was stated originally. In addition to the foregoing specific wing member structure, the wing includes other construction: Guide posts 43 are centered in erect position on a dividing plane between the wing members 2, 3 (Figs. 1 and 3). The upper ends of the posts are secured at 44 to a triangular entering edge 45 as in the foregoing patent. The other ends of the post are secured at 46 to the fuselage 29. These posts are perfectly rigid, and their inner parts 47 (Fig. 1) serve as guides along which the sides of the adjacent inner sections of the racks 40 slide (Fig. 4) during the rectilinear motion 4 (Fig. 3). The posts and these particular rack sections are, therefore, a great aid in properly guiding the wing members, insuring the preservation of the space 48 between the wing members.

Driving power is applied to the wing members according to any one of a number of known ways. The shaft 19ᵃ (Fig. 1) carries either a spur gear 49 or a sprocket to which the driving member of an engine is applied. The shaft 19 is provided with a similar gear or sprocket 50 for the same purpose. From this it will be understood that both shafts are drive shafts. The particular advantage of this occurring when the wing is used as a lifting wing, at which time the greatest amount of power is required. The wing can be attached either along the side of or across the fuselage. The general driving scheme may be the same as that in the foregoing patent. Driving means, other than the spur gear 49, is at present omitted.

The operation is readily understood. It has been brought out before that the chief purpose of the invention is to prevent the slamming together of the wing members 2, 3, especially when they reenter their rectilinear paths of motion 4 (Fig. 3) after having completed their oppositely outward arcuate circuits.

At that particular time the straight rack sections 40, 40ª are out of mesh with the respective spur pinions 35, 35ª and are about to remesh therewith. When that occurs, the last teeth 42, 42ª of the rounded parts 41, 41ª "ease in" the racks and pinions, while the rounded parts themselves revolve against the posts 43, the entire operation so buffing or absorbing the shock of the change in direction from arcuate to rectilinear as to make the motion of the wing members as smooth as possible with a mechanical contrivance.

Immediately after this reengagement occurs, the flanges 36, 36ª take up their positions beside the innermost rack sections 40, 40ª, while the rack sections themselves take up their positions beside the guide posts 43. Inasmuch as the guide posts come between the rack sections it follows that said posts prevent the rounded portions 41 from striking each other. The subsequent sliding engagement of the rack sections like the posts preserves the space 48 (Fig. 4) so that the wing members never come into contact at any time during the complete cycle. As the cycles of operation of the wing members are repeated the wheels 18, running on the inserts 12, 13 and 14 between the plates 6, 7 and 8 serve to guide said members, especially keeping them from endwise motion.

As already brought out before, the greatest lifting effort occurs between the spur pinion 35 and rack sections 40. The points of the bevel pinion teeth 33 mainly idle along the inner racks 37, aiding the lifting effort to some extent, but chiefly making sure of an immediate registration of the bevel pinion with the bevel gear sections 38. It is this registration and end meshing that compels the arcuate motion of the wing members, the sole driving effort then being between the bevel pinions and the bevel gear sections.

I claim:—

1. In an aircraft having a wing member consisting of a plurality of separate members, said members combining to constitute the sustaining surface; means for moving said members on oppositely arcuate paths and then along parallel rectilinear paths, and anti-slamming means to diminish the shock upon the change from arcuate to rectilinear motion, said anti-slamming means being independent of said moving means and comprising driver pinions, and straight rack sections carried by the members going into mesh with the pinions at the beginning of the rectilinear motion.

2. In an aircraft having a wing member consisting of a plurality of separate members, said members combining to constitute the sustaining surface; means carried by the aircraft for moving said members on oppositely arcuate paths and then along parallel rectilinear paths, at least one post in position to guide said members along the rectilinear path, and anti-slamming means to both drive said members and diminish the shock upon the change from arcuate to rectilinear motion, said anti-slamming means being independent of said moving means and comprising driver pinions, a source of driving power for said pinions and for said moving means, and straight rack sections carried by the members going into mesh with the pinions at the beginning of the rectilinear motion, the ends of the racks being rounded to aid engagement and disengagement of the rack sections with the post and to diminish the size of the last teeth so as to facilitate the meshing of the racks with the pinions.

3. In an aircraft, a wing member including end plates, each end plate having matching central slots, a drive shaft extending through the slots, a continuous gear track on at least one end plate surrounding the slot, straight rack sections flanking straight parts of the gear track, means to drive the shaft including a bevel pinion in constant mesh with the gear track, and a spur pinion forming part of the bevel pinion and meshing with the straight rack sections in succession.

4. In an aircraft having a wing member consisting of a plurality of separate members, said members combining to constitute the sustaining surface; means for moving said members with successive rectilinear and arcuate motions, said means including a source of driving power, spur pinions in driven connection with said source and elements on said members with which the pinions engage to produce the rectilinear motion, and means centered on the dividing plane between said members and being periodically engaged by said elements to continuously guide said members during their entire rectilinear motion to prevent said members from contacting.

5. In an aircraft having a wing consisting of a plurality of separate members, said members combining to constitute the sustaining surface; means for moving said members with successive rectilinear and arcuate motions, said means including a source of driving power, spur pinions in driven connection with said source and elements on said members with which the pinions engage to produce the rectilinear motion, and means centered on the dividing plane between said members and being continuously engaged by said elements only during rectilinear motion of said members, to preserve a definite space between the members during their entire rectilinear motion.

6. In an aircraft having a wing member consisting of a plurality of separate members, said members combining to constitute the sustaining surface; means for moving said members with successive rectilinear and arcuate motions, said means including a source of driving power, spur pinions in driven connection with said source and elements on said members with which the pinions engage to produce the rectilinear motion, and at least one rigid post centered on the dividing plane between the members and located in position to be continuously contacted by said elements of the foregoing moving means during said rectilinear motion of the members thereby to keep said members fixedly spaced.

7. In an aircraft having a wing member consisting of a plurality of separate members, said members combining to constitute the sustaining surface; means for moving said members with successive rectilinear and arcuate motions, said means including a source of driving power, spur pinions in driven connection with said source and elements on said members with which the pinions engage to produce the rectilinear motion, said elements consisting of straight rack sections on the respective members periodically meshed by the pinions, and a rigid post centered on the dividing plane between the members and located between the racks for continuous mutual sliding contact by the sides of the racks during the entire period of rectilinear motion.

8. In an aircraft, separate wing members adapted to periodically traverse rectilinear paths, means to move the wing members along said paths including a source of driving power terminating in spur pinions, a straight rack section on the end of each wing member, said rack sections periodically meshing with the spur pinions to produce the rectilinear motion of the wing members, and circular flanges combined with the pinions, extending beyond the peripheries of the pinion teeth and contacting the remote sides of the racks to aid in holding the wing members in place during said motions.

9. In an aircraft, separate wing members adapted to periodically traverse rectilinear paths, means to move the wing members along said paths including a source of driving power terminating in spur pinions, a straight rack section on the end of each wing member, said rack sections periodically meshing with the spur pinions to produce the rectilinear motions of the wing members, a rigid post centrally situated on the dividing plane between the wing members and located between the racks for sliding contact of the near sides of the racks during rectilinear motion, and circular flanges combined with the pinions extending beyond the pinion teeth and contacting with the remote sides of the racks.

10. In an aircraft, a pair of wing members successively movable along parallel rectilinear paths and then on oppositely outward arcuate paths, means for accomplishing said motions consisting of a continuous gear track carried by each wing member and comprising semi-circular bevel tooth end sections and connecting spur gear side racks, drive bevel pinions and a source of driving power connected with said pinions, the pinions being in full mesh with the end sections to positively drive said members in their arcuate motions and having the points of their teeth in idling mesh with the racks during rectilinear motion, straight rack sections flanking the side racks, and spur pinions combined and driven with the bevel pinions fully meshing with the straight racks to positively drive said members during rectilinear motion.

11. In an aircraft, a wing member, means for moving said member end over end comprising a source of driving power terminating in a composite gear block consisting of a bevel and a spur pinion, a continuous gear track fastened to said wing member and in constant mesh with the bevel pinion, and a pair of rack sections also fastened to said wing member, periodically meshing with the spur pinion.

12. In an aircraft, a hollow wing member, driving means for moving said member with successive rectilinear and arcuate motions, said means including a drive shaft extending longitudinally through said member, and means to stabilize the motions of the member, said means including a continuous track inside of the member, a guide wheel on the shaft in contacting relationship to the track, and plates on opposite sides of the track extending inwardly thereof to overlap the guide wheel and prevent endwise motion of the wing member.

13. In an aircraft, a pair of wing members carried by said aircraft and having central slots, at least one post centered on the plane which divides said members, a cross shaft carried by said post, gear blocks mounted on said shaft, each block consisting of spur and bevel pinions and a circular flange which divides said pinions, drive shafts extending longitudinally of the members, and through the slots therein, each having a bevel gear in mesh with the respective pinions, continuous gear tracks in constant mesh with the bevel pinions, the teeth of said tracks having an outward pitch to facilitate the meshing of the bevel pinion teeth, and said tracks including semicircular end sections, and straight rack sections to periodically mesh with the spur pinions, the confronting sides of said rack sections periodically engaging the sides of the post, and said circular flanges periodically engaging the remote sides of said rack sections and periodically engaging the semi-circular end sections of the continuous gear tracks.

14. In an aircraft, a drive shaft and means carried by the aircraft by which the drive shaft is driven, a wing member of elongated cross section operable by the drive shaft, a driving beveled gear affixed to the drive shaft and an elongated continuous gear track affixed to the wing member, said beveled gear and track being in confronting relationship, and a beveled pinion permanently intermeshing with the beveled gear and said track to operate the wing member with an end over end motion, said pinion by virtue of permanently intermeshing with said gear and track keeping the wing member under constant control of the drive shaft so that the wing member cannot run away.

HERMAN KLATT.